US00RE36670E

United States Patent [19]

Watts, Jr. et al.

[11] E Patent Number: Re. 36,670

[45] Reissued Date of Patent: Apr. 25, 2000

[54] FLAT PANEL DISPLAY ATTRIBUTE GENERATOR

[75] Inventors: LaVaughn F. Watts, Jr., Temple; Mark A. Rendon, Belton, both of Tex.

[73] Assignee: Texas Instruments Incorporated, Dallas, Tex.

[21] Appl. No.: 08/833,269

[22] Filed: Aug. 31, 1994

Related U.S. Patent Documents

Reissue of:

[64] Patent No.: 5,153,575
Issued: Oct. 6, 1992
Appl. No.: 07/717,186
Filed: Jun. 18, 1991

U.S. Applications:

[63] Continuation of application No. 07/214,230, Jul. 1, 1988, abandoned.

[51] Int. Cl.[7] ..... G09G 3/18; G09G 5/24

[52] U.S. Cl. ..... 345/87; 345/141; 345/194; 345/130; 345/471; 707/529

[58] Field of Search ..... 345/471, 468, 345/472, 467, 128, 130, 141, 192, 193, 194, 25, 26

[56] References Cited

U.S. PATENT DOCUMENTS

| | | | |
|---|---|---|---|
| 4,646,077 | 2/1987 | Culley | 345/192 |
| 4,716,405 | 12/1987 | Yamaguchi | 345/194 |
| 4,742,344 | 5/1988 | Nakagawa et al. | 345/26 |
| 4,745,561 | 5/1988 | Hirosawa et al. | 345/471 |
| 4,751,508 | 6/1988 | Matsushita | 345/195 |
| 4,757,311 | 7/1988 | Nakamura et al. | 345/127 |
| 4,783,650 | 11/1988 | Bugg | 345/141 |
| 4,849,747 | 7/1989 | Ogawa et al. | 345/193 |

*Primary Examiner*—Raymond J. Bayerl
*Attorney, Agent, or Firm*—Ronald O. Neerings; Richard L. Donaldson

[57] ABSTRACT

An electronic terminal employs a liquid crystal display for displaying desired characters. The terminal has circuitry for providing attributes to the characters, on a character-by-character basis or on a plurality of characters basis. These attributes include double width, double height, underline, inversion and intensity control. These attributes are formed using minimal additional memory and circuitry.

14 Claims, 7 Drawing Sheets

NORMAL CHARACTER

UNDERLINE

DOUBLE WIDE

DOUBLE HIGH

FLAT PANEL DISPLAY ATTRIBUTE GENERATOR

Matter enclosed in heavy brackets [ ] appears in the original patent but forms no part of this reissue specification; matter printed in italics indicates the additions made by reissue.

RELATED APPLICATIONS

This application is a continuation of application Ser. No. 07/214,230 filed Jul. 1, 1988, entitled "FLAT PANEL DISPLAY ATTRIBUTE GENERATOR" by LaVaughn F. Watts, Jr. and Mark A. Rendon, now abandoned.

BACKGROUND OF THE INVENTION

1. Field of the Invention

This invention relates to electronic systems having flat planel displays and more particularly to a flat panel display that employs a full range of attributes.

2. Description of the Prior Art

In the past, attributes for liquid crystal displays have been formed by recreating a character set for each attribute or combination of attributes desired. These are not truly attributes, but rather character sets that emulate the attributes for character presentations. This arrangement of displaying character attributes is expensive for each character in terms of hardware, specifically storage.

Another prior art method is to employ a very fast processor for real time storing of a modified character font into a character generator. However, this system is expensive since the processor, memory speed, and support logic must be very fast to store characters, modify characters, and display characters as fast as the communication link is providing presentation protocol commands. Further, since size and power is of consideration, the power required for such a system is not readily available.

This invention allows the user of a small terminal having an LCD display to employ host protocols defining the display attributes and having the same visual presentation of the characters affected in the same manner as a desk top cathode ray tube (CRT) terminal. The invention eliminates this major drawback to the use of the flat panel technology for computers and terminals.

BRIEF SUMMARY OF THE INVENTION

Desk top terminals are designed with high quality CRT displays using host-to-terminal presentation protocols that enhance the readability of the characters displayed on the CRT. These protocols define video attributes that affect the visual presentation of the displayed characters on the CRT. The CRT uses a raster scan technology and the generation of individual attributes and combinations of these attributes is straightforward.

With the increased need for small display terminals, or lap top terminals, the LCD display technology was developed to provide a CRT type display within the portable environment. The liquid crystal display has become very popular as a flat panel display for the portable terminals. The display devices to date, however, have had a limitation as to the quality of the display and the quality of the characters displayed.

Host presentation protocols were not implemented as those on standard desk top CRT units. In many cases, the LCD display was able to generate one attribute, but lacked the ability to generate multiple attributes with the same quality as the CRT. The ability to provide underlining, reverse image, blinking, double wide and double high characters on the display was not available.

This invention provides for the generation of the necessary attributes for commonly used CRT display terminals on a flat panel display. It provides for both character-by-character mode attribute displays and for field mode displays. Both nodes of display may be resident within the memory and may be display controlled.

The invention provides for "N" number of attributes, dependent only on the available amount of storage for the attribute flag (bit) associated with the affected visual display. If the field attribute is on, only one bit of information is needed to describe the visual presentation for the entire field. If the character mode is on, only one bit of information per character is needed to describe the visual presentation for the character.

This invention provides for a method of display and attribute definition to define either combined character and attribute flags within the same device, or separate display character and attribute memory. Only the method of decoding the attribute flags changes with the storage technique. In this preferred embodiment, the implementation of the screen and attribute memory is in separate memories to enhance the number of communication terminal protocols that can be supported without major logic changes, but this is an engineering design choice.

In this preferred embodiment, the LCD is driven by and LCD controller, specifically a HITACHI Model HD63645. This controller is also appropriate for driving an electroluminescent display. The selection of this particular controller is, of course, an engineering choice. Other flat panel displays that may be used include the gas discharge or plasma display.

The terminal of this invention employs a character memory that is a random access memory (RAM) and an attribute memory which is also a RAM.

A character generator memory is employed and it too is a RAM. The character generator memory is down loaded with the bit map definition (font) of each character set.

The microprocessor employed in this invention is the HITACHI Model 64180, obviously an engineering choice. This microprocessor is used for initializing the character RAM and the character generator RAM, as outlined above. It also communicates with the LCD which, in this preferred embodiment, is manufactured by the Optrex Company, for setting parameters such as the size of the field.

The microprocessor sends the code for a selected character together with the attribute desired for that character, the character code being applied to the character RAM and the attribute code being applied to the attribute RAM. The character code is supplied as an address to the character RAM and results in the contents of the particular address being sent to the character generator RAM as still another address. The desired font is found at that address in the character generator RAM. The attribute code from the attribute RAM is further decoded by attribute circuitry and ultimately applied to the font of the desired character which is sent from the character generator RAM to the controller for ultimate display as modified by the attribute.

The principal object of this invention is to provide the flat panel display of a terminal with the ability to display all the attributes normally associated with a CRT display. This and other objects will be made evident in the detailed description that follows.

DETAILED DESCRIPTION OF THE INVENTION

This invention enables a terminal (or computer having a flat panel display to provide all of the attributes to the characters displayed on such panel that are ordinarily displayed on CRT displays associated with terminal or computers. Following is a detailed description of the circuitry and method used to provide such attributes.

Figure 1:
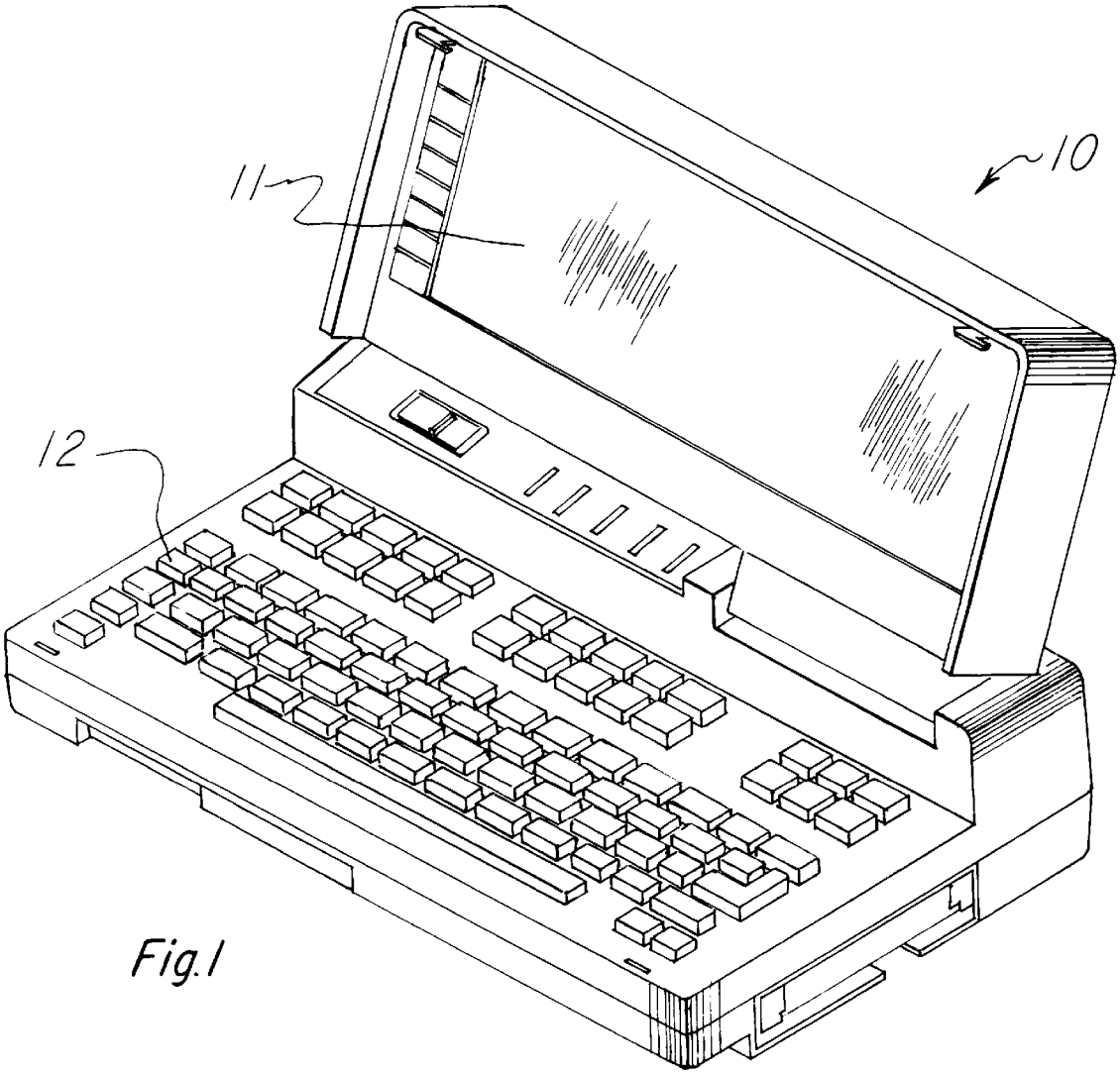
FIG. 1 is a prespective drawing of the terminal and flat panel display of this invention.

Turning first to FIG. 1, terminal 10 is shown having a keyboard 12 and having a flat panel display 11. As indicated earlier, the flat panel display in this preferred embodiment is an LCD display, but could also be an electroluminiscent display without any significant alteration. That is, the same controller 14 (FIG. 3) would be used. Also contemplated is the use of a gas discharge or plasma flat panel display. As a gas discharge system, a different controller would have to be selected.

Figure 2A:
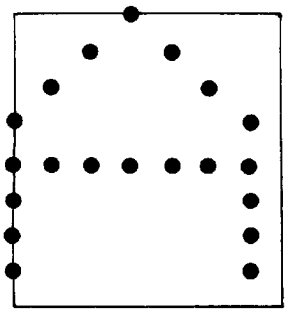
FIG. 2a illustrates a normal character and FIGS. 2b–2d illustrate characters modified by available attributes.

FIG. 2a illustrates the font of an ordinary letter A.

Figure 2B:
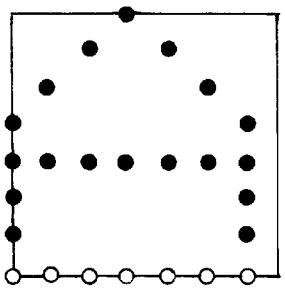

FIG. 2b illustrates the letter A, underlined as caused by the underline attribute.

Figure 2C:
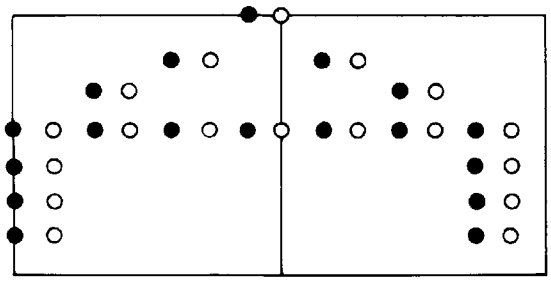

FIG. 2c illustrates a double wide font for the letter A.

FIG. [2b] *2d* illustrates a double high font for the letter A.

A reverse character attribute causes the letter A to become white and the backgroung to become dark.

The light intensity attribute causes the letter A to appear brighter.

Figure 3:
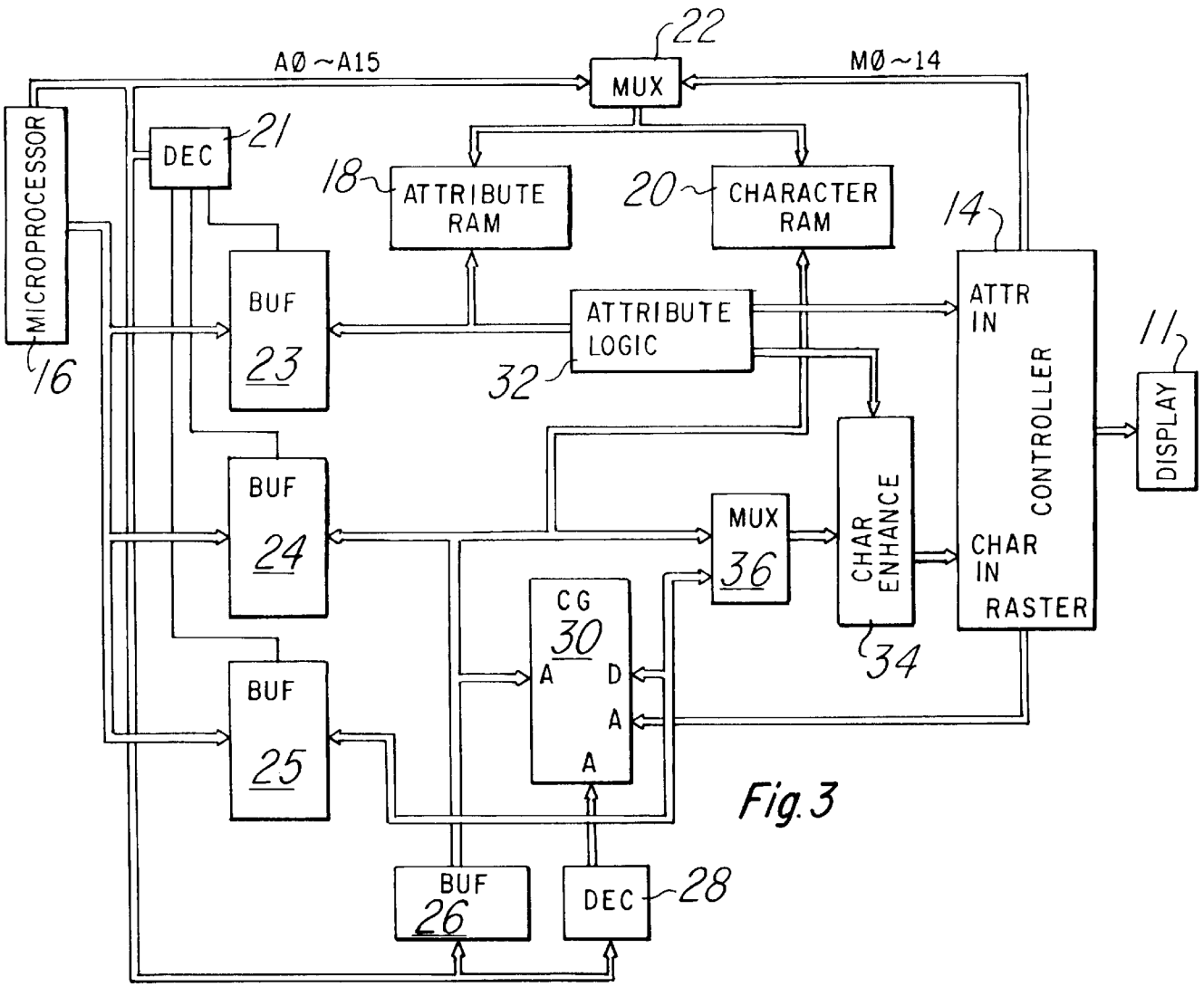
FIG. 3 is a block diagram of the character generation and attribute circuitry.

FIG. 3 is a block diagram illustrating the character and attribute generation. Microprocessor 16 is shown with an output of address bits A0–A15 which are selectively applied to character RAM 20 and attribute RAM 18. Microprocessor 16 also has data output lines which are applied to buffers 23, 24 and 25, selected through the simple decoder 21. When buffer 23 is enabled, then data is passed through to attribute RAM 18 at the address specified by lines A0–A15. An attribute code is thereby written in at a specified address.

When buffer 24 is enabled, then data is applied to character RAM 20 at address A0–A15, such data defining a character code at the particular address. Attribute is associated with the character when the address is the same for both RAMs.

When buffer is selected by decode 21, then the output from micorprocessor 16 to character generator RAM 30. The data coming from microprocessor 16 in this case is a particular character font which corresponds to the character code stored in character RAM 20. In this preferred embodiment, the characters are eight pixels wide and eight pixels high. Therefore, to form a character on the flat panel display, eight [pytes] *bytes* of pixel data are required. All eight bytes of any other characters displayed in the same area will also be read out. Then, a second raster is selected and the procress repeated for all characters. This procedure is repeated until all eight rasters have been completed, thereby completing each of the characters. The successive addresses of the selected letters in the rasters is accomplished by using three bits as a tag on the address to thereby provide a total of eight additional byte addresses to complete each character.

Buffer 26 and decoder 28 are used in a graphics mode of display which will not be discussed here.

Controller 14 has a data input from microprocessor 16 (not shown) for establishing the starting and ending addresses, size of screen, smooth scrolling, etc. Controller 14 addresses character RAM 20 and attribute RAM 18 through mux 22, starting with the starting address and causing the character code from character RAM 20 at the starting address to reference character generator RAM 30 to provide the font as described above. The attribute RAM yields an attribute code as follows:

| Bit | |
|---|---|
| | CHARACTER-BY-CHARACTER |
| 0 | Supplement Character Code on High |
| 1 | Double High<br>11 - Double High Bottom Half<br>10 - Double High Top Half |
| 2 | OX - User Configurable |
| 3 | Reverse Video Character on High |
| 4 | Underline Character on High |
| 5 | Bold Character on Low (or hide on high if bold mode disabled) |
| 6 | Bold Character on Low |
| 7 | Double Wide Character on High |
| | FIELD FORMAT |
| 0 | Supplement Character Code on High |
| 1 | Software Control |
| 2 | Software Control |
| 3 | Reverse Video Character on High |
| 4 | Underline Character on High |
| 5 | Blinking Character on High |
| 6 | Bold Character on Low |
| 7 | Latch Current Attribute Data on High |

These attribute codes are sent into attribute logic 32 for direct application to controller 14 or to character enhance 34. Controller 14 has a very limited repertoire of attributes, including blinking and reverse video. Other attributes, including double wide, double high, underline, screen invert and intensity are applied to character enhance 34 which received the font output from character generator RAM 30 through mux 36. The characters are enhanced as called for by the particular attributes and sent into controller 14.

Controller 14 sends appropriate signals to display 11 for proper display of the characters as modified by the attributes.

Figure 4:
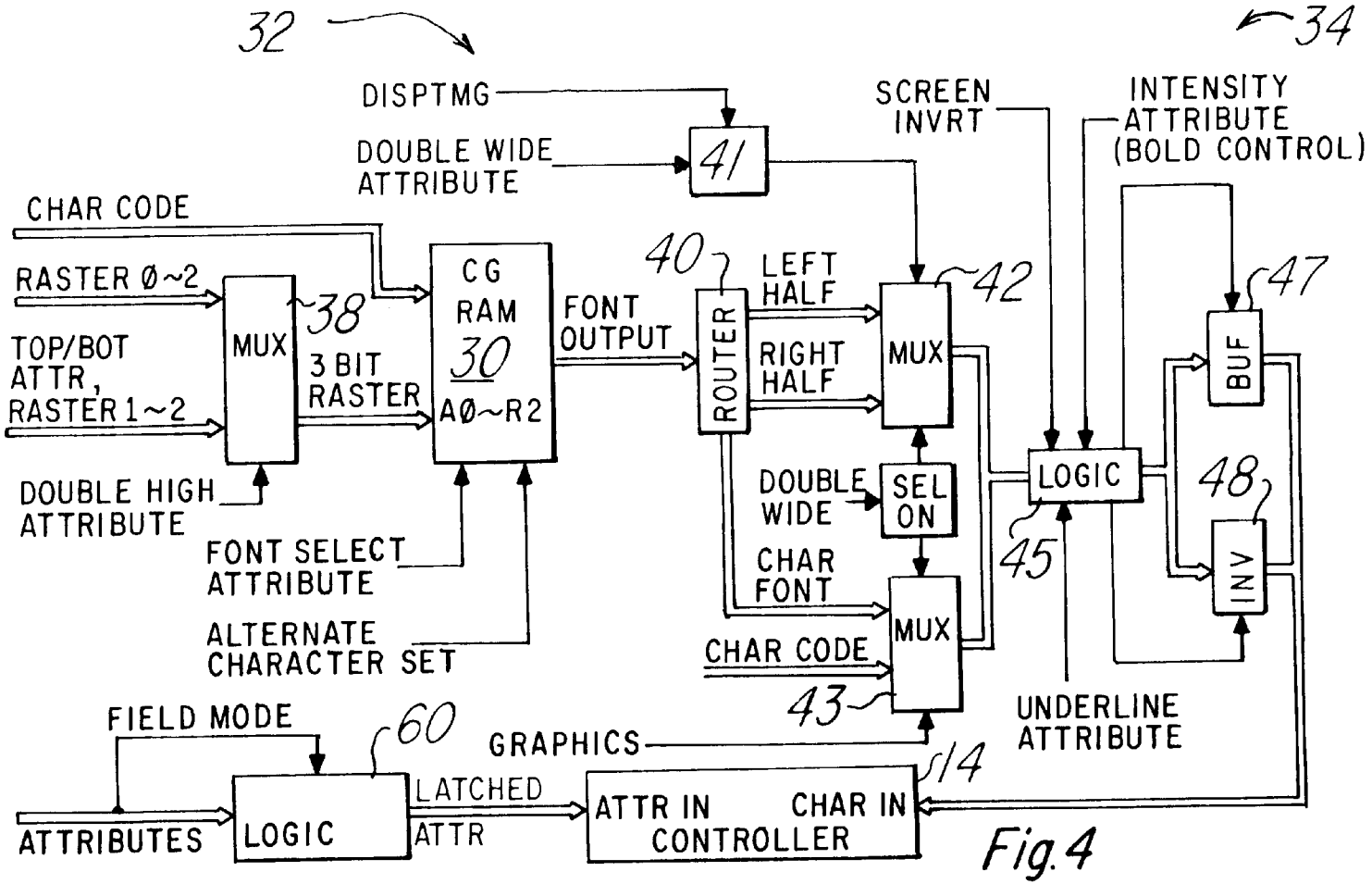
FIG. 4 is a detailed block diagram of the attribute circuitry.

FIG. 4 illustrates attribute logic 32 and character enhance 34 in detailed block form.

Character generator RAM 30 is shown with an input from mux 38 which has raster 0–2 input, the addressing mechanism for the font as described. Mux 28 also has signal top/bot attribute providing raster signal 1–2 for use with double high attribute.

Character generator RAM 30 is shown with a font select attribute for selecting a font different from the font in use for alternate or simultaneous presentation.

Router 40 receives the font output from character generator RAM 30. Router 40 (see FIG. 5) essentially splits the input signals by providing two conductors for each conductor input. The left half output of router 40, therefore, has eight conductors as does the right half output, both applied to mux 42. Gate 41 is shown having the double wide attribute as one input and the display timing signal as another input for enabling mux 42. Also, the double wide input, when selected, is applied to mux 42 and to mux 43. Mux 43 is shown having the character font as one input and the character code at another. The graphics signal enables the character code. The output from mux 42 and from mux 43 are combined into logic 45. Logic 45 has a screen invert attribute, the intensity attribute and the underline attribute as additional inputs. The output from logic 45 is applied to buffer 47 and inverter 48 whose outputs are combined into controller 14.

The attributes are applied to logic 60 which, in the presence of a field mode, passes the latched attributes as inputs to controller 14. Logic 60 retains the information until such time as it is dropped, thereby enabling the same attribute or attributes to be applied to a succession of characters.

Figure 5:
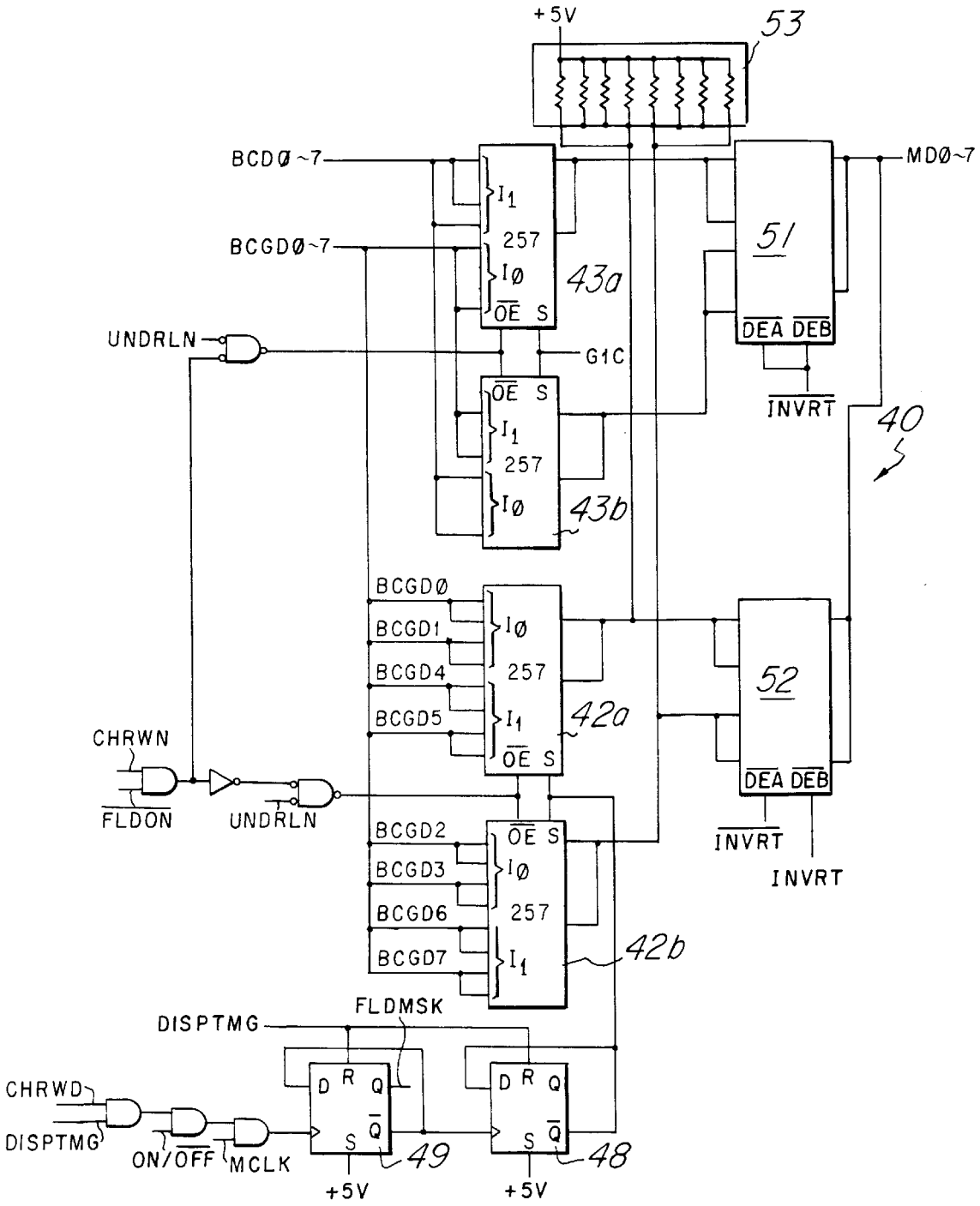
FIG. 5 is a schematic diagram of the double wide and underline circuitry of this invention.

FIG. 5 illustrates buffers 42 and 43 from FIG. 4 as 42a and 42b, and 43b, respectively. Buffers 43a and 43b are used in the graphics mode which will not be described.

The underline attribute signal is shown gated into the disabling controls of buffers 42a and 42b. At the proper time, such disabling provides the high impedance output which then diverts the voltage through resistor bank 53 to driver 52, either inverted or not inverted, to provide underline information to controller 14.

When the double wide signal, CHRWD, is gated into flip flop 49, flip flop 49 toggles and sets flip flop 48 which presents a "1" output to the S inputs of buffers 42a and 42b, enabling signals BCGD4, BCGD5, BCGD5, BCGD6 and BCGD7 to be sent, in pairs as indicated, to logic 45 (FIG. 4). To provide a double wide character, the character first designated to be double wide must be sent at which time the Q-output of flip flop 48 will be a "0", enabling the passage of signals BCGD0, BCGD1, BCGD2 and BCGD3, the right half of the desired double wide character, thus forming the two double wide halves to form a font such as shown in FIG. 2c.

Figure 6:
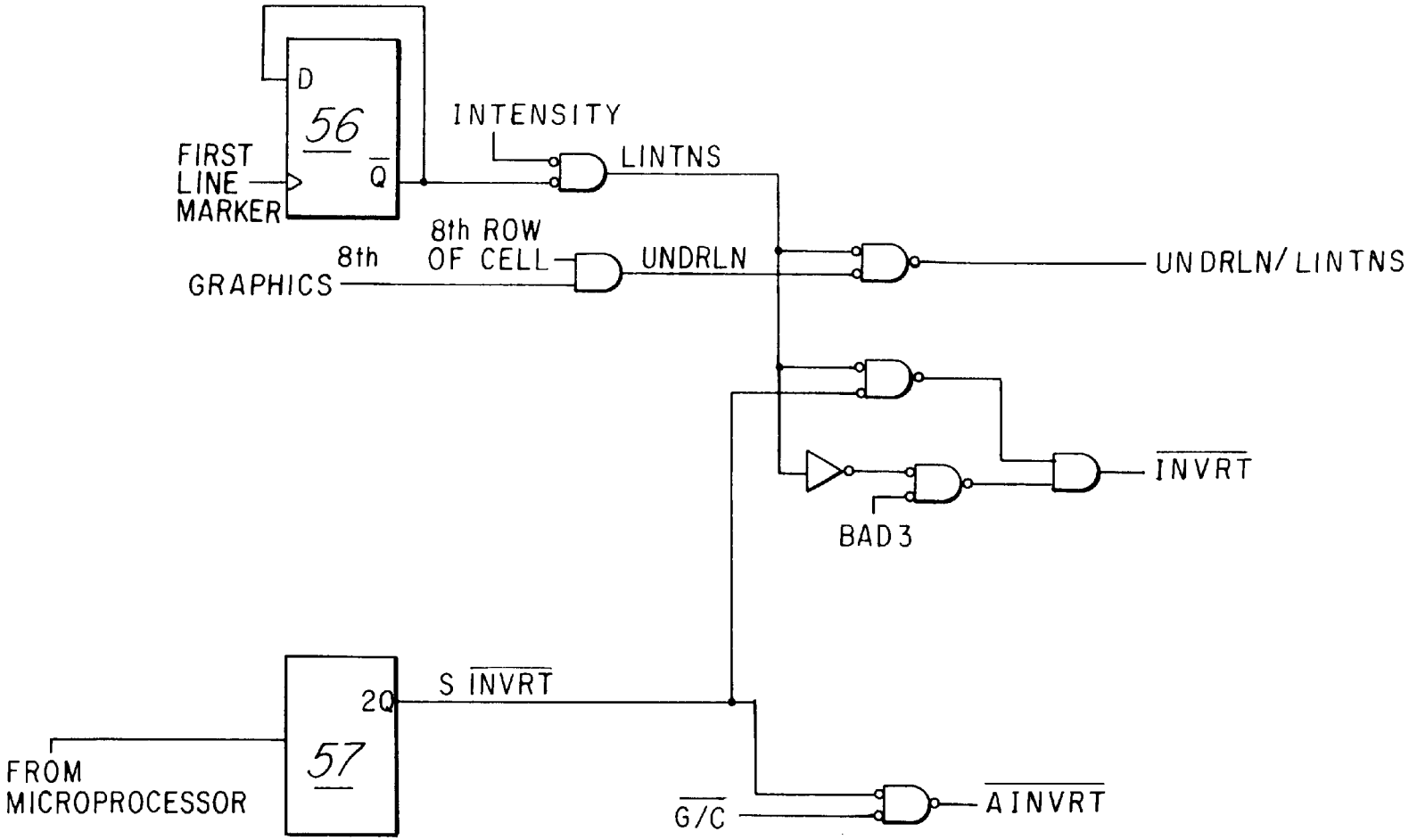
FIG. 6 is a schematic diagram of the ciruitry for implementing the intensity, underline, and invert attributes.

FIG. 6 illustrates the intensity attribute being gated with the output from flip flop 56 which is clocked by the first line marker signal (FLM) from controller 14 to provide signal LINTNS which is the low intensity signal. The eighth row signal, generated as indicated earlier, is gated by the graphic signal as the underline signal, which in turn is gated with the LINTNS signal, to produce signal UNDRLN/LINTNS. When the intensity attribute is high, then signal LINTNS is low and signal UNDRLN/LINTNS is low, causing the selected font to be activated on display 11. Every time that signal FLM occurs, as long as the intensity attribute line is high, the selected character will be activated. When the intensity attribute is low, then every other time that signal FLM sets flip flop 56, signal LINTNS will be high, causing the character to not be activated and to blend with the background. In this way, the average appearance is of a character having lower intensity than when the intensity attribute is present.

The eighth raster signal and graphics signal is provided to eliminate any underline from the graphics mode.

Flip flop 57 is selectively set by a signal from the microprocessor 16 for a screen invert, resulting in signal SINVRT—which is gated as shown to provide an inverted screen so long as the signal is output from flip flop 57.

Figure 7:
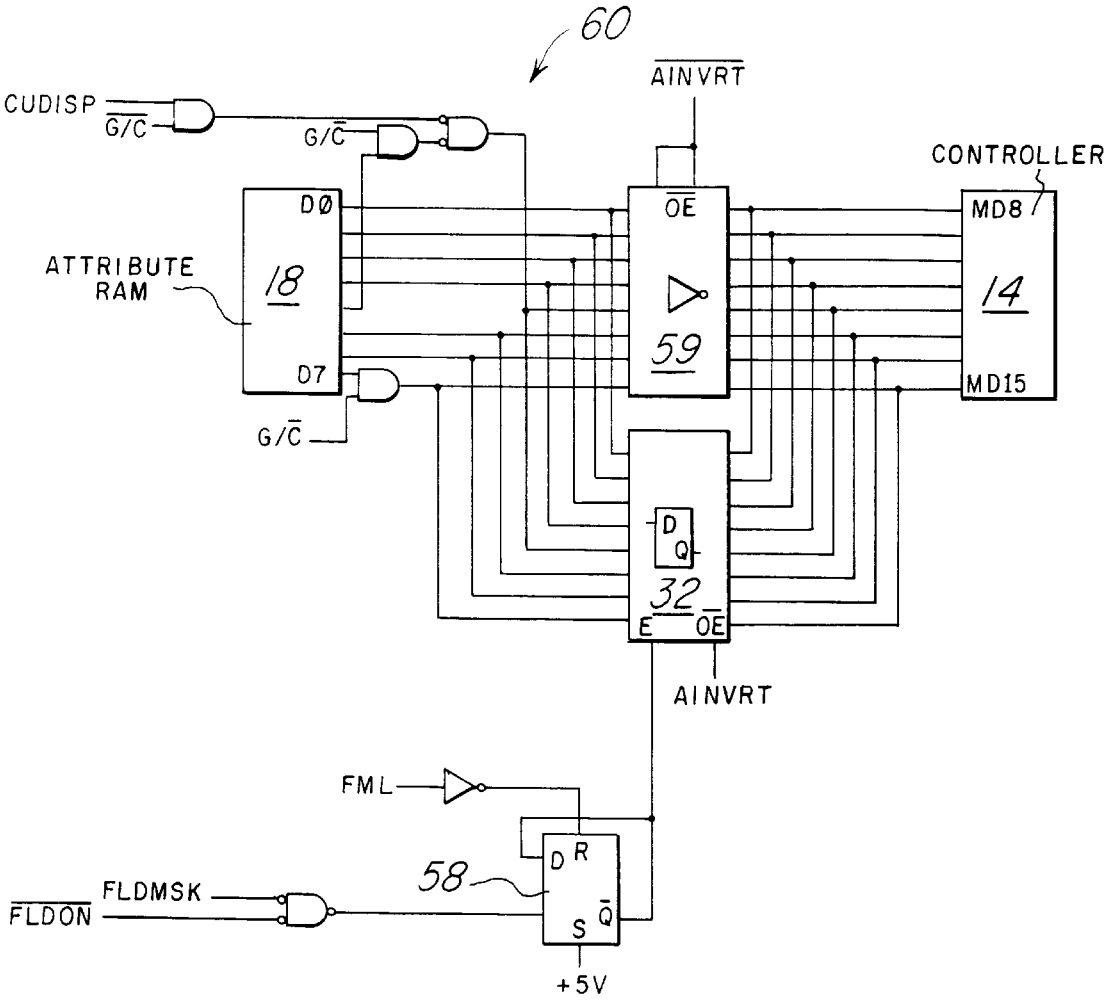
FIG. 7 is a schematic diagram illustrating the circuitry of the field mode attribute.

FIG. 7 illustrates logic 60, which includes attribute RAM 18 having outputs D0–D7 applied to buffer 59 which is used in the graphics mode and will not be described here. Outputs D0–D7 are also applied to attribute logic 32 whose outputs are applied to controller 14. Attribute logic 32 is controlled by flip flop 58 which in turn is controlled by a field mask attribute (FLDMSK) and the signal FLDON-from microprocessor 16 for causing the output from attribute logic 32 to remain constant until changed by the output of flip flop 58, thus latching the selected attribute for any number of successive characters.

PREFERRED MODE OF OPERATION

If it is desired to display the double wide character A as shown in FIG. 2c, then microprocessor 14 must store the character code for A in character RAM 20 and must also store the desired font for A in character generator RAM 30. Further, the double width attribute is stored by microprocessor 16 in attribute RAM 18. Controller 14 reads out the font for A as described above and also the double wide attribute from attribute RAM 18. Then, as shown in FIGS. 4 and 5, the two halves of A are doubled to provide a double wide A.

Figure 2D:
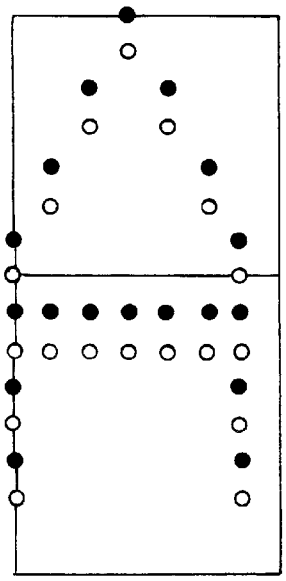

If a double high character, such as shown in FIG. 2d is desired, then the character code for A must be stored and the font for A stored as indicated for double wide. As in double wide. A must be referenced twice to provide a double high character. Referring to FIG. 4, the double high attribute is shown applied to mux 38 with an input for top/bottom attribute, with raster 1, 2. In this instance, bit 0 of the raster bits 0, 1 and 2 is held constant so that bits 1 and 2 determine the raster count. The raster count is thereby simply repeated each time. With reference to FIG. 2d, it can be seen that on the first raster, a single dot is displayed and on the second raster, another single dot is displayed. On the third raster, a pair of dots is displayed and on the fourth raster, the same pair of dots is displayed again and so on to ultimately form the top of the letter A. The bottom is then selected and the same procedure is done with the letter A. Together then, a double high A is formed.

The operation of the other attributes such as underline, screen invert, and intensity have been described.

In summary, this invention enables all desired attributes of a CRT display to be available in the flat panel display.

It is anticipated that those with ordinary skill in the art can select other components and provide different circuitry, without departing from the scope of this invention which is limited only by the appended claims.

What is claimed is:

1. An attribute generator for a flat panel [liquid crystal] system, said flat panel display system capable of displaying pixels representative of characters on a flat panel and having a character generating circuit for generating a plurality of character codes representing a plurality of characters displayable by said flat panel, and further having a flat panel controller coupled to said flat panel, the attribute generator comprising:

a microprocessor producing an attribute code having a predetermined number of bits, said attribute code indicative of the manner in which a character is to be displayed on said flat panel;

an attribute memory coupled to said microprocessor, said attribute memory being adapted for receiving said attribute code from said microprocessor and storing said received attribute code;

a raster generating circuit for generating a raster code indicative of a pixel pattern representative of said character to be displayed; and a character cell generator memory coupled to said raster generating circuit and said character generating circuit, said character cell generator memory operable for receiving a predetermined number of bits of said raster code from said raster generating circuit and receiving said character code from said character generating circuit, said received raster code bits forming most significant address bits and combining with said received character code forming least significant address bits, said combined address bits accessing said character cell generator memory for retrieving a character font [having a predetermined matrix of a predetermined number of rows and columns of pixels representing said character], *and* said pixels being further modified for display on said flat panel in response to said attribute codes from said attribute memory.

2. [The flat panel attribute generator, as set forth in claim 1,] *An attribute generator for a flat panel system, said flat panel display system capable of displaying pixels representative of characters on a flat panel and having a character generating circuit for generating a plurality of character codes representing a plurality of characters displayable by said flat panel, and further having a flat panel controller coupled to said flat panel, comprising:*

*a microprocessor producing an attribute code having a predetermined number of bits, said attribute code indicative of the manner in which a character is to be displayed on said flat panel;*

*an attribute memory coupled to said microprocessor, said attribute memory being adapted for receiving said attribute code from said microprocessor and storing said received attribute code;*

*a raster generating circuit for generating a raster code indicative of a pixel pattern representative of said character to be displayed;*

*a character cell generator memory coupled to said raster generating circuit and said character generating circuit, said character cell generator memory operable for receiving a predetermined number of bits of said raster code from said raster generating circuit and receiving said character code from said character generating circuit, said bits accessing said character cell generator memory for retrieving a character font, and said pixels being further modified for display on said flat panel in response to said attribute codes from said attribute memory; and* wherein said microprocessor produces a double high attribute and a top and bottom attribute, said attributes being stored in said attribute memory, said character cell generating memory receives a top and bottom attribute bit from said attribute memory as the most significant bit of said address in response to said double high attribute, said character cell generating memory producing a top character cell having a pixel pattern correlative to a character font half duplicated along each row, and bottom character cell having a pixel pattern correlative to a bottom character font half duplicated along each row.

3. [The flat panel attribute generator, as set forth in claim 1,] *An attribute generator for a flat panel display system, said flat panel display system capable of displaying pixels representative of characters on flat panel and having a character generating circuit for generating a plurality of character codes representing a plurality of characters displayable by said flat panel, and further having a flat panel controller coupled to said flat panel, comprising:*

*a microprocessor producing an attribute code having a predetermined number of bits, said attribute code indicative of the manner in which a character is to be displayed on said flat panel;*

*an attribute memory coupled to said microprocessor, said attribute memory being adapted for receiving said attribute code from said microprocessor and storing said received attribute code;*

*a raster generating circuit for generating a raster code indicative of a pixel pattern representative of said character to be displayed;*

*a character cell generator memory coupled to said raster generating circuit and said character generating circuit, said character cell generator memory operable for receiving a predetermined number of bits of said raster code from said raster generating circuit and receiving said character code from said character generating circuit, said bits accessing said character cell generator memory for retrieving a character font, and said pixels being further modified for display on said flat panel in response to said attribute codes from said attribute memory; and* wherein said microprocessor further produces a double wide attribute stored by said attribute memory, further comprising:

a router coupled to said character cell generating memory and receiving therefrom said character font, said router separating said received character font into a left and right half in response to the presence of said double wide attribute; and a double wide logic circuit coupled to said router and receiving said left and right character font halves, producing a first character cell having a pixel pattern correlative to said left character font half duplicated along each column, and a second character cell having a pixel pattern correlative to said right character font half duplicated along each column.

4. [The flat panel attribute generator, as set forth in claim 1,] wherein said microprocessor produces an underline attribute, said attribute being stored in said attribute memory, further comprising underline logic circuitry coupled to said character cell generator memory and receiving said character font, said underline logic circuitry manipulating said pixels in a last row of [said] *a* matrix *of a number of rows and columns of pixels representing said character,* to effect underlining in response to said underline attribute being received from said attribute memory.

5. The flat panel attribute generator, as set forth in claim 4, wherein said underline logic circuitry inverts said pixels in said last row of said matrix.

6. The flat panel attribute generator, as set forth in claim 5, wherein said underline logic circuitry inverts said pixels in said last row of a bottom matrix in a double high character.

7. The flat panel attribute generator, as set forth in claim 5, wherein said underline logic circuitry inverts said pixels in said last rows of both the left and right half matrices in a double wide character.

8. [The flat panel attribute generator, as set forth in claim 1,] *An attribute generator for a flat panel display system, said flat panel display system capable of displaying pixels representative of characters on a flat panel and having a character generating circuit for generating a plurality of character codes representing a plurality of characters displayable by said flat panel, and further having a flat panel controller coupled to said flat panel, comprising:*

*a microprocessor producing an attribute code having a predetermined number of bits, said attribute code*

*indicative of the manner in which a character is to be displayed on said flat panel;*

*an attribute memory coupled to said microprocessor, said attribute memory being adapted for receiving said attribute code from said microprocessor and storing said received attribute code;*

*a raster generating circuit for generating a raster code indicative of a pixel pattern representative of said character to be displayed;*

*a character cell generator memory coupled to said raster generating circuit and said character generating circuit, said character cell generator memory operable for receiving a predetermined number of bits of said raster code from said raster generating circuit and receiving said character code from said character generating circuit, said bits accessing said character cell generator memory for retrieving a character font, and said pixels being further modified for display on said flat panel in response to said attribute codes from said attribute memory; and* wherein said microprocessor produces an intensify attribute, said attribute being stored in said attribute memory, further comprising an intensify logic circuit coupled to said character cell generator memory and receiving said character font, said intensify logic circuit causing said controller to display pixels in [said] *a* matrix *of a number of rows and columns of pixels representing said character,* to be turned on at a higher refresh rate in response to said intensify attribute being received from said attribute memory.

9. The flat panel attribute generator, as set forth in claim 1, wherein said microprocessor produces an inverse attribute, said attribute being stored in said attribute memory, further comprising an inverse logic coupled to said character cell generator memory and receiving said character font, said inverse logic circuit inverting every pixel in [said] *a* matrix *of a number of rows and columns of pixels representing said character,* in response to said inverse attribute being received from said attribute memory.

10. The flat panel attribute generator, as set forth in claim 1, wherein said microprocessor produces a field mode attribute, said attribute being stored in said attribute memory, further comprising a field mode logic circuit coupled to said character cell generator memory and receiving said character font, said field mode logic circuit causing an attribute to modify more than one character.

*11. The flat panel attribute generator, as set forth in claim 1, wherein said flat panel display system is a flat panel liquid crystal display system.*

*12. An attribute generator for a flat panel display system, said flat panel display system capable of displaying pixels representative of characters on a flat panel and having a character generating circuit for generating a plurality of character codes representing a plurality of characters displayable by said flat panel, and further having a flat panel controller coupled to said flat panel, comprising:*

*a microprocessor producing an attribute code having a predetermined number of bits, said attribute code indicative of the manner in which a character is to be displayed on said flat panel;*

*an attribute memory coupled to said microprocessor, said attribute memory being adapted for receiving said attribute code from said microprocessor and storing said received attribute code;*

*a raster generating circuit for generating a raster code indicative of a pixel pattern representative of said character to be displayed; and*

*a character cell generator memory coupled to said raster generating circuit and said character generating circuit, said character cell generator memory operable for receiving a predetermined number of bits of said raster code from said raster generating circuit and receiving said character code from said character generating circuit, said received raster code bits forming least significant address bits and combining with said received character code forming most significant address bits, said combined address bits accessing said character cell generator memory for retrieving a character font, and said pixels being further modified for display on said flat panel in response to said attribute codes from said attribute memory.*

*13. An attribute generator for a flat panel display system, said flat panel display system capable of displaying pixels representative of characters on a flat panel and having a character generating circuit for generating a plurality of character codes representing a plurality of characters displayable by said flat panel, and further having a flat panel controller coupled to said flat panel, comprising:*

*a microprocessor producing an attribute code having a predetermined number of bits, said attribute code indicative of the manner in which a character is to be displayed on said flat panel;*

*an attribute memory coupled to said microprocessor, said attribute memory being adapted for receiving said attribute code from said microprocessor and storing said received attribute code;*

*a raster generating circuit for generating a raster code indicative of a pixel pattern representative of said character to be displayed; and*

*a character cell generator memory coupled to said raster generating circuit and said character generating circuit, said character cell generator memory operable for receiving a predetermined number of bits of said raster code from said raster generating circuit and receiving said character code from said character generating circuit, said received raster code bits forming one of most significant address bits and least significant address bits and combining with said received character code forming the other of said most significant address bits and least significant address bits, said combined address bits accessing said character cell generator memory for retrieving a character font, and said pixels being further modified for display on said flat panel in response to said attribute codes from said attribute memory.*

*14. An attribute generator for a flat panel display system, said flat panel display system capable of displaying pixels representative of characters on a flat panel and having a character generating circuit for generating a plurality of character codes representing a plurality of characters displayable by said flat panel, and further having a flat panel controller coupled to said flat panel, comprising:*

*a microprocessor producing an attribute code having a predetermined number of bits, said attribute code indicative of the manner in which a character is to be displayed on said flat panel;*

*an attribute memory coupled to said microprocessor, said attribute memory being adapted for receiving said attribute code from said microprocessor and storing said received attribute code;*

*a raster generating circuit for generating a raster code indicative of a pixel pattern representative of said character to be displayed; and*

*a character cell generator memory coupled to said raster generating circuit and said character generating circuit, said character cell generator memory operable for receiving a predetermined number of bits of said raster code from said raster generating circuit and character code from said character generating circuit combined in a single word, said combined bits accessing said character cell generator memory for retrieving a character font, and said pixels being further modified for display on said flat panel in response to said attribute codes from said attribute memory.*

* * * * *

UNITED STATES PATENT AND TRADEMARK OFFICE

CERTIFICATE OF CORRECTION

PATENT NO. : Re.36,670
DATED : Apr. 25, 2000
INVENTOR(S) : LaVaughn F. Watts, Jr., et al It is certified that error appears in the above-identified patent and that said Letters Patent is hereby corrected as shown below:

| | |
|---|---|
| Column 8, line 38 | Remove the bracket before the word "The" |
| Column 8, line 39 | Delete the bracket after the number "1," |

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*